United States Patent [19]
Vazza

[11] Patent Number: 5,354,818
[45] Date of Patent: Oct. 11, 1994

[54] LIVESTOCK FEED FROM POTATO WASTE

[75] Inventor: Albin L. Vazza, Boardman, Oreg.

[73] Assignee: Vazza Farms, Boardman, Oreg.

[21] Appl. No.: 72,814

[22] Filed: Jun. 7, 1993

Related U.S. Application Data

[63] Continuation-in-part of Ser. No. 973,845, Nov. 9, 1992, abandoned.

[51] Int. Cl.$^5$ .............................................. A23B 7/10
[52] U.S. Cl. .................................. 426/53; 426/54; 426/60; 426/442; 426/443; 426/637
[58] Field of Search .................... 426/53, 60, 54, 442, 426/443, 637; 424/442

[56] References Cited

U.S. PATENT DOCUMENTS 3,958,015 5/1976 Gay ........................................ 426/53
4,144,132 3/1979 Lines ..................................... 426/53

Primary Examiner—John J. Gallagher
Attorney, Agent, or Firm—Chernoff, Vilhauer, McClung & Stenzel

[57] ABSTRACT

A method of producing livestock feed from potato processing waste is disclosed that uses a starch-hydrolyzing enzyme, two fermenting yeasts, such as *Saccharomyces cerevisiae* and *Candida utilis*, and the yeast *Saccharomycopsis fibuliger*. The enzyme and yeasts are added in a particular sequence to comminuted potato waste after the potato particles have been heated and cooled to certain temperatures.

23 Claims, No Drawings

LIVESTOCK FEED FROM POTATO WASTE

This is a continuation in part of application Ser. No. 07/973,845 filed Nov. 9, 1992, now abandoned.

BACKGROUND OF THE INVENTION

This invention relates to the production of livestock feed and more particularly to converting potato waste to a nutritious livestock feed through the growth of yeasts using potato waste as a growth medium.

Persons engaged in raising and marketing livestock are continually searching for a high-quality, economical livestock feed since the cost of feed represents a substantial portion of the cost of bringing an animal to market. The most cost effective feeds result from the conversion of a potential waste product to a feed product. Potato waste from plants processing sweet potatoes or producing potato flakes, granules, french fries or potato chips is a waste product which is too poor in quality to use effectively as animal feed and which is often merely discarded as a slurry. In addition, because such slurries can degrade water quality, the disposal of slurries of potato waste is an expensive matter, subject to federal and state regulations.

What is needed, therefore, is an economical method of converting potato waste having only minimal food value into a nutritious livestock feed.

Mense U.S. Pat. No. 2,738,274 discloses a process for preparing livestock feed by inoculating a substrate with a culture and growing a strain of bacteria on it. The substrate is various finely divided, steamed and cooled vegetable materials, including potatoes. The Mense patent does not disclose or suggest the use of yeast as an inoculant.

Lines U.S. Pat. No. 4,144,132 discloses the production of single-cell protein by using potato processing waste as a growth medium for the yeasts *Endomycopsis fibuliger* and *Candida utilis*. However, the yeasts fail to utilize all the starch in the potato waste and cease growing before all the carbohydrates in the potato waste are converted to proteins.

Muller et al. U.S. Pat. No. 4,046,789 discloses a process for separating bakery-type waste products into reusable sugar, starch, protein and fat components by solvent extraction of the fat components and the addition of a starch-hydrolyzing enzyme and a yeast of the *Saccharomyces* or *Candida* type to the starch-containing residue. Kanter U.S. Pat. No. 4,894,244 discloses a process utilizing an amyloglucosidase and *Candida utilis* to produce a product suitable for human consumption. However, each of these processes is intended to produce a human food product, and therefore is conducted under conditions designed to limit any impurities which would render the product unsuitable for human food. Neither of the processes is economically feasible in a process for the production of livestock feed.

SUMMARY OF THE INVENTION

The present invention overcomes the foregoing drawbacks of the prior art by providing an economical and efficient method of making livestock feed from potato waste. Potato waste is comminuted into particles and the particles are heated. The particles are then cooled to a cooling temperature lower than that temperature at which a starch-hydrolyzing enzyme is inactivated and a starch-hydrolyzing enzyme is added to the particles. The particles are further cooled to a cooling temperature lower than that temperature at which a fermenting yeast is inactivated and a yeast is added to the particles. The particles, with added enzyme and yeast, are then divided into two portions. A second yeast, which is different from the first-added yeast, is added to the first portion. A third yeast, which is different from the first-added and second-added yeasts, is added to the second portion, and the yeasts present in the portions are permitted to grow. The first and second portions are then recombined and the yeasts present are permitted to grow. At least two of the three yeasts are fermenting yeasts. Finally, the batch is dried to form livestock feed.

In an alternative embodiment, after the same comminution, heating, cooling and starch-hydrolyzing enzyme addition steps, the particles are further cooled to a cooling temperature lower than that temperature at which a fermenting yeast is inactivated. The particles, with added enzyme, are divided into two portions. Two of three different yeasts are added to the first portion, and the third yeast is added to the second portion. At least two of the three yeasts are fermenting yeasts. The yeasts present in the two portions are permitted to grow. The first and second portions are then recombined and the yeasts present are permitted to grow. The batch is then dried to form the feed.

The starch-hydrolyzing enzyme aids in the conversion of the starch present in the potato waste to sugars which the fermenting yeasts utilize during their growth. One of the three yeasts preferred is *Saccharomycopsis fibuliger*, which is able to directly utilize starch during its growth. The particular combination and order of addition of yeasts and enzymes insures that virtually all carbohydrate present in the potato waste is used to support the growth of the yeasts. By the process, a low protein, high carbohydrate waste is converted to a high protein, low carbohydrate livestock feed.

The market value of livestock feed is determined on the basis of the amount of dry protein present in the feed and is calculated from a feed price per 1 wt % protein per ton (currently approximately $5 per wt % protein per ton). Thus, each 1% increase in protein results in a significant corresponding increase in value in the livestock feed product.

DETAILED DESCRIPTION OF THE PREFERRED EMBODIMENTS

According to the present invention potato waste is converted by yeasts to a nutritious livestock feed. The potato waste, from plants processing sweet potatoes, producing potato flakes, granules, french fries or potato chips, may include the waste slurry from steam or abrasive peelers, potato trimmings from inspection tables, improperly blanched potatoes, finished potato product from cold storage which is damaged due to dehydration or grade problems, and undersized potatoes from storage that do not meet fresh pack or processing standards. The potato waste is ground, chopped, riced or otherwise comminuted to form particles, each particle preferably having no dimension greater than 1/16th inch, before being placed in a holding tank.

The potato particles are preferably heated by injecting super heated steam through an enclosed auger as the particles are transferred from the holding tank to a first fermentation tank that is equipped with heating and cooling coils and a stirrer. The particles are preferably heated to a temperature of at least 100° C. to insure that each cell in each potato particle is heated or cooked.

Water is added to the heated particles in the first fermentation tank to form a slurry which is about 80 wt % water. The particles are cooled to a temperature below the temperature at which a starch-hydrolyzing enzyme such as amylase is inactivated, preferably to between 55° to 60° C. An amylase such as an amyloglucosidase is added to the cooled slurry. A suitable commercially available amyloglucosidase is sold under the name "Diazyme L-200" and is available from Solvay Enzymes, Inc. of Elkhart, Ind. The amyloglucosidase is preferably added to the particles in an amount approximating 0.25 wt %. The heating and cooling coils of the fermentation tank maintain the selected temperature of the slurry while the starch-hydrolyzing enzyme contacts the particles for 1–2 hours.

The temperature of the particles in the fermentation tank is reduced to a cooling temperature lower than that temperature at which a fermenting yeast is inactivated, and a first yeast is added to the fermentation tank. A suitable cooling temperature is 25° to 30° C.

About half the slurry with added enzyme and yeast is transferred to a second fermentation tank, which is also equipped with heating and cooling coils and a stirrer, thereby forming a second portion, the first portion comprising that remaining in the first fermentation tank. A second yeast is added to the first portion and a third yeast is added to the second portion. At least two of the three added yeasts are fermenting yeasts, which are capable of using a sugar such as glucose for their own growth and producing protein. A particularly preferred fermenting yeast is *Saccharomyces cerevisiae*, which produces protein and B-complex vitamins during its growth. A second preferred fermenting yeast is *Candida utilis*. A preferred third yeast is *Saccharomycopsis fibuliger*. All such yeasts are commercially available from Wyeast Laboratories of Mt. Hood, Ore.

The yeasts are added to the particles in an amount approximating 2.0 wt %. The two portions are mixed or stirred under aerobic conditions at the selected temperatures for about two hours.

The two portions are recombined into one batch and the batch is maintained under aerobic conditions for a minimum of about 48 hours. Excess water is removed from the batch, for example, by a centrifuge. The excess water is recovered and returned to a holding tank, where additional nutrients such as phosphorus may be added, for reuse in the production of the next batch of livestock feed. The livestock feed may be dried, for example, in a cyclone drier, and shaped into pellets or cubes, as desired.

In an alternative embodiment of the present invention, the slurry of potato particles with added amyloglucosidase is divided prior to the addition of any yeast. As described above, potato waste is comminuted and heated to a temperature of at least 100° C. Water is added to the heated particles in the first fermentation tank to form a slurry which is about 80 wt % water. The particles are cooled to a temperature below the temperature at which a starch-hydrolyzing enzyme is inactivated, preferably to between 55° to 60° C. An amylase such as amyloglucosidase is added to the cooled slurry. The heating and cooling coils of the fermentation tank maintain the selected temperature of the slurry while the starch-hydrolyzing enzyme contacts the particles for 1–2 hours.

The temperature of the particles in the fermentation tank is reduced to a cooling temperature lower than that temperature at which a fermenting yeast is inactivated, and about half the slurry with added enzyme is transferred to a second fermentation tank, which is also equipped with heating and cooling coils and a stirrer, thereby forming a second portion, the first portion comprising that remaining in the first fermentation tank.

Two of three yeasts are added to the first portion and the third yeast is added to the second portion. At least two of the three yeasts are fermenting yeasts. In a preferred embodiment, a first fermenting yeast such as *Saccharomyces cerevisiae* and a second fermenting yeast such as *Candida utilis* are added to the first portion and the yeast *Saccharomycopsis fibuliger* is added to the second portion. The yeasts are added to the particles in an amount approximating 2.0 wt % and the temperature of 25° to 30° C. is maintained while the two portions are mixed or stirred under aerobic conditions for about 2 hours.

The two portions are recombined into one batch and the batch is maintained under aerobic conditions for a minimum of about 48 hours. As described above, excess water is removed from the batch and is recovered and returned to a holding tank, and the converted potato waste is dried and shaped as desired.

EXAMPLE 1

Step 1. Raw potato waste from a steam peeler was ground so that no dimension of any individual particle was greater than ⅛ th inch. The sample was divided into three equal portions, designated A, B and C. Water was added to each portion to provide a potato slurry comprising about 80 wt % water, and each portion was then heated to a temperature of at least 100° C.

Step 2. The temperature of each of the three portions was lowered to the same temperature between 55° and 60° C., 0.25 wt % of a starch-hydrolyzing amyloglucosidase enzyme sold as Diazyme L-200 was added to each portion, and the temperature was maintained for two hours.

Step 3. The temperature of each portion was further reduced to the same temperature between 25° and 30° C. Yeasts were added to each of the three portions in an amount approximating 2.0 wt % as follows: *Saccharomyces cerevisiae* was added to portions A and B, and *Candida utilis* was added to portion C. Each of the three separate portions was mixed thoroughly and the yeasts were allowed to grow. The temperature was maintained in each of the three portions.

Step 4. After about two hours, portion A was divided into two equal parts, part 1 and part 2. *Candida utilis* was added to part 1. *Saccharomycopsis fibuliger* was added to part 2. The temperature in each part was maintained between 25° and 30° C. for about two hours and the yeasts were allowed to grow. Thus, part 1 contained *Saccharomyces cerevisiae* and *Candida utilis*, while part 2 contained *Saccharomyces cerevisiae* and *Saccharomycopsis fibuliger*.

Step 5. Parts 1 and 2 of portion A were recombined and the yeasts *Saccharomyces cerevisiae*, *Candida utilis*, and *Saccharomycopsis fibuliger* were allowed to continue to grow until growth ceased, for a total of about 48 hours. In portion B the yeast *Saccharomyces cerevisiae* was allowed to continue to grow until growth ceased, for a total of about 24 hours. In portion C the yeast *Candida utilis* was allowed to continue to grow until growth ceased, for a total of about 24 hours.

Step 6. Each portion A, B and C was dried and the average protein content of each of the three portions was determined. The protein content is presented in Table 1.

TABLE 1

| Sample | Average Protein (wt %) |
|---|---|
| A | 23.05 |
| B | 18.54 |
| C | 13.74 |

As shown in Table 1, a livestock feed produced by the method of the present invention showed at least a 25% greater protein content than livestock feed produced by methods not utilizing the split batch/recombination steps. Such increased protein content significantly increased the value of the livestock feed.

EXAMPLE 2

Steps 1 and 2 of Example 1 were repeated except the portions were designated D, E and F.

Step 3. The temperature of each portion was reduced to the same temperature between 25° and 30° C., and approximately 2 wt % yeasts were added to each portion. Portion D was divided into two equal parts, part 1 and part 2. *Saccharomyces cerevisiae* and *Candida utilis* were added to part 1; *Saccharomycopsis fibuliger* was added to part 2. *Saccharomyces cerevisiae* was added to portion E. *Candida utilis* was added to portion F. Each portion was mixed and the yeasts present in each portion were allowed to grow. The temperature was maintained in each portion.

Step 4. After about four hours, parts 1 and 2 of portion D were recombined and the yeasts were allowed to continue to grow while the temperature was maintained between 25° and 30° C. until growth ceased, for a total of about 48 hours. In portion E, the yeast *Saccharomyces cerevisiae* was allowed to continue to grow until growth ceased, for a total of about 24 hours. In portion F, the yeast *Candida utilis* was allowed to continue to grow until growth ceased, for a total of about 24 hours.

Step 5. Each portion D, E and F was dried and the average protein content of each of the three portions was determined. The results are presented in Table 2.

TABLE 2

| Sample | Average Protein (wt %) |
|---|---|
| D | 22.87 |
| E | 18.41 |
| F | 13.93 |

As shown in Table 2, livestock feed produced by the method of the present invention had a significantly higher protein content.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of making a livestock feed from potato waste, comprising the steps of:
    (a) comminuting potato waste to form particles;
    (b) heating said particles;
    (c) cooling said particles to a cooling temperature lower than that temperature at which a starch-hydrolyzing enzyme is inactivated and adding to said particles in a starch-hydrolyzing enzyme;
    (d) cooing said particles to a cooling temperature lower than that temperature at which a fermenting yeast is inactivated and adding to said particles a first yeast;
    (e) dividing said particles containing said starch-hydrolyzing enzyme and said first yeast into first and second portions and adding a second yeast to said first portion, and adding a third yeast to said second portion;
    (f) permitting said first and second yeasts to grow in said first portion and permitting said first and third yeasts to grow in said second portion;
    (g) combining said first portion and said second portion to form a recombined batch and permitting said first, second, and third yeasts to grow in said recombined batch; and
    (h) drying said recombined batch to form livestock feed
wherein two of said first, second and third yeasts are fermenting yeasts, and one of said first, second and third yeasts is the yeast *Saccharomycopsis fibuliger*.

2. The product produced by the process of claim 1.

3. The method of claim 1 wherein one of said first, second and third yeasts is the fermenting yeast *Saccharomyces cerevisiae*.

4. The method of claim 1 wherein one of said first, second and third yeasts is the fermenting yeast *Candida utilis*.

5. The method of claim 1 wherein said two fermenting yeasts are *Saccharomyces cerevisiae* and *Candida utilis*.

6. The product produced by the process of claim 5.

7. The method of claim 1 wherein step (b) is conducted at a temperature of $\geq 100°$.

8. The method of claim 1 wherein said starch-hydrolyzing enzyme is an amyloglucosidase.

9. The method of claim 8 wherein the amount of said amyloglucosidase present is approximately 0.25 wt. %.

10. The method of claim 1 wherein said cooling temperature of step (c) is between 55° and 60° C. and said method includes the step of contacting said particles with said starch-hydrolyzing enzyme for between about one and two hours.

11. The method of claim 1 wherein step (f) is conducted for about two to four hours.

12. The method of claim 1 wherein said yeasts in said recombined batch of step (g) are permitted to grow for at least about 48 hours.

13. A method of making a livestock feed from potato waste, comprising the steps of:
    (a) comminuting potato waste to form particles;
    (b) heating said particles;
    (c) cooling said particles to a cooling temperature lower than that temperature at which a starch-hydrolyzing enzyme is inactivated and adding to said particles a starch-hydrolyzing enzyme;
    (d) dividing said particles containing said starch-hydrolyzing enzyme into first and second portions and adding a first yeast and a second yeast to said first portion, and adding a third yeast to said second portion, wherein two of said first, second and third yeasts are fermenting yeasts, and one of said first, second and third yeasts is *Saccharomycopsis fibuliger*;

(e) permitting said first and second yeasts to grow in said first portion and permitting said third yeast to grow in said second portion;

(f) combining said first portion and said second portion to form a recombined batch and permitting said first, second, and third yeasts to grow in said recombined batch; and (g) drying said recombined batch to form livestock feed.

14. The product produced by the process of claim 13.

15. The method of claim 13 wherein one of said first, second and third yeasts is the fermenting yeast *Saccharomyces cerevisiae*.

16. The method of claim 13 wherein one of said first, second and third yeasts is the fermenting yeast *Candida utilis*.

17. The method of claim 13 wherein said *Saccharomycopsis fibuliger* is added to said second portion in step (d).

18. The method of claim 17 wherein two of said first, second and third yeasts are the fermenting yeasts *Saccharomyces cerevisiae* and *Candida utilis*.

19. The product produced by the process of claim 18.

20. The method of claim 13 wherein said starch-hydrolyzing enzyme is an amyloglucosidase.

21. The method of claim 13 wherein step (c) is conducted at a temperature between 55° and 60° C. and said method includes the step of contacting said particles with said starch-hydrolyzing enzyme for from about one to about two hours.

22. The method of claim 13 wherein step (e) is conducted for from about two to about four hours.

23. The method of claim 13 wherein said yeasts in said recombined batch of step (f) are permitted to grow for at least about 48 hours.

* * * * *

UNITED STATES PATENT AND TRADEMARK OFFICE
CERTIFICATE OF CORRECTION

PATENT NO. :  5,354,818

DATED       :  October 11, 1994

INVENTOR(S) :  Albin L. Vazza

It is certified that error appears in the above-identified patent and that said Letters Patent is hereby corrected as shown below:

Col. 6, line 37   After "$\geq 100°$" insert --C--.

Signed and Sealed this

Twenty-ninth Day of August, 1995

Attest:

BRUCE LEHMAN

Attesting Officer    Commissioner of Patents and Trademarks